Oct. 29, 1946. G. A. JOHNSON ET AL 2,410,165
FRICTION SHOCK ABSORBER
Filed Dec. 24, 1943
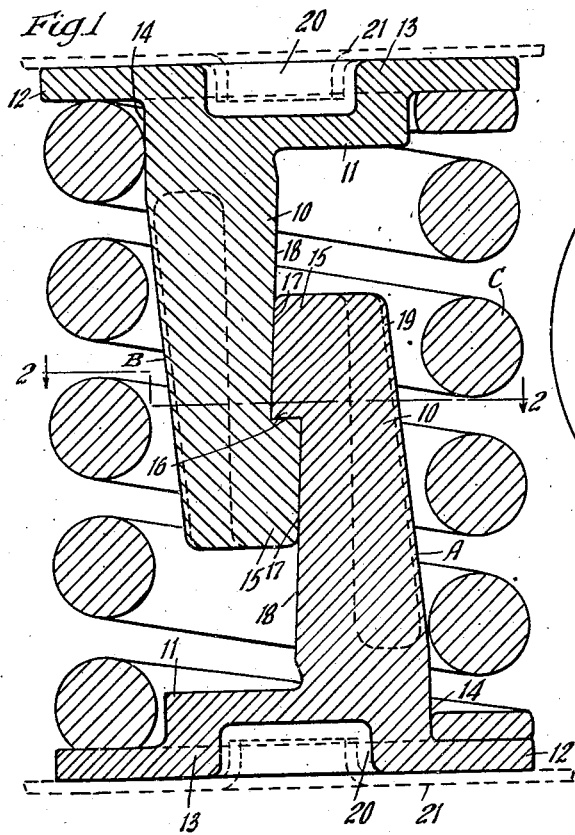
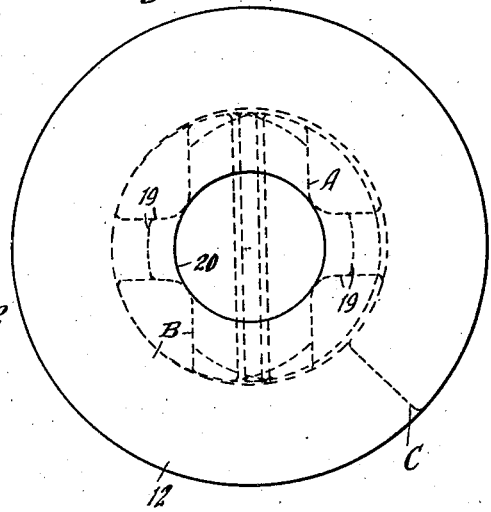
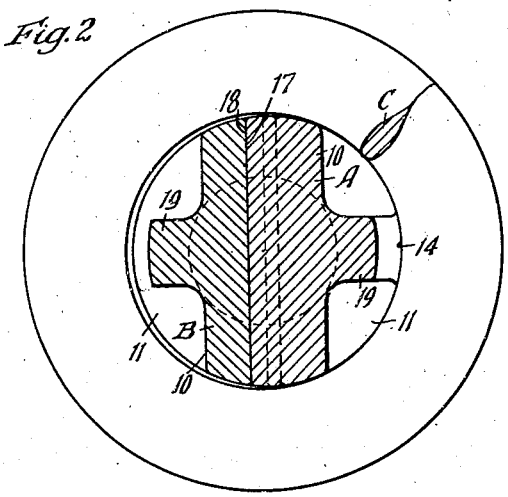
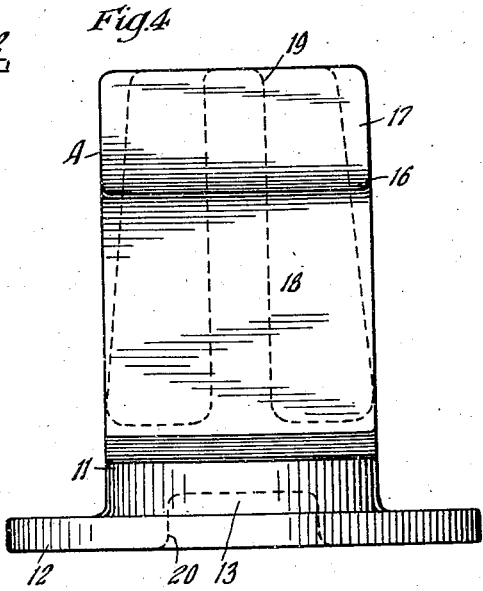
Inventors
George A. Johnson
Stacy B. Haseltine
By Henry Fuchs
Atty.

Patented Oct. 29, 1946

2,410,165

UNITED STATES PATENT OFFICE 2,410,165

FRICTION SHOCK ABSORBER

George A. Johnson, Chicago, and Stacy B. Haseltine, La Grange, Ill., assignors to W. H. Miner, Inc., Chicago, Ill., a corporation of Delaware Application December 24, 1943, Serial No. 515,518

6 Claims. (Cl. 267—9)

1

This invention relates to improvements in friction shock absorbers, especially adapted for use in connection with railway car trucks for snubbing the action of the usual truck springs.

One object of the invention is to provide a friction shock absorber adapted to be substituted for one or more of the spring units of a cluster of truck springs of a railway car, comprising a pair of relatively slidable friction elements and spring means opposing relative movement of said elements, wherein the spring means also acts to press said elements into tight frictional contact with each other.

A more specific object of the invention is to provide a friction shock absorber, as specified in the preceding paragraph, wherein the friction elements are in the form of relatively slidable friction posts having interengaging friction surfaces which are inclined to the central longitudinal axis of the mechanism and said posts have base flanges at opposite ends of the mechanism formed integral with the posts and on which the posts are adapted to rock, and wherein the spring resistance is in the form of a coil surrounding said posts bearing on said base flanges to resist tilting of the posts away from each other as they are spread apart due to the action of the cooperating inclined surfaces thereof, and wherein the spring is canted due to the tilting of the post, thereby exerting pressure to force said posts tightly together and provide high frictional resistance in opposition to lengthwise movement of said posts.

Other objects of the invention will more clearly appear from the description and claims hereinafter following.

In the drawing forming a part of this specification, Figure 1 is a vertical sectional view of our improved friction shock absorber. Figure 2 is a horizontal sectional view, corresponding substantially to the line 2—2 of Figure 1. Figure 3 is a top plan view of Figure 1. Figure 4 is an elevational view, looking from left to right in Figure 1, of the lower friction post of our improved shock absorber.

Our improved shock absorber comprises broadly two similar friction posts A and B and a spring resistance C.

The friction posts A and B are identical, each post comprising a vertically disposed heavy plate 10 having a cylindrical base portion or member 11 eccentric thereto, and a laterally extending annular flange 12 projecting from said base portion, concentric with the vertical central axis of the mechanism. The base portion 11 is slightly

2 eccentric with respect to the vertical central axis of the mechanism and said base portion 11 and flange 12 together form a follower plate or disc member 13 which cooperates with the spring resistance C. The peripheral cylindrical surface of the base portion 11 of the plate 10, which surface is indicated by 14, presents a substantially vertically extending abutment wall for a purpose hereinafter described. The two posts A and B are reversely arranged, that is, the post B is inverted with respect to the position of the post A. As shown most clearly in Figure 1, the follower plate member 13 of the post A is located at the bottom end of the mechanism and has the friction plate 10 upstanding therefrom while the follower plate portion 13 of the post B is located at the upper end of the mechanism and has the friction plate 10 depending therefrom.

The free end portion of the friction plate section of each post is laterally inwardly enlarged, as indicated at 15, thereby providing a horizontal shoulder 16. As clearly shown in Figure 1, the enlarged portion 15 of the post A is at the upper end thereof, while the enlarged portion of the post B is at the lower end of the latter and the shoulders of the two posts overhang each other to engage and limit separation of the posts in lengthwise direction and hold the mechanism assembled.

On the inner side, the friction plate member 10 of each post has flat friction surfaces 17 and 18 offset with respect to each other, said friction surfaces being formed respectively on the inward enlargement 15 and the main body portion of said plate member, the friction surface 17 of the post A having sliding contact with the friction surface 18 of the post B and the friction surface 18 of the post A having sliding contact with the friction surface 17 of the post B. As clearly shown in Figure 1, the friction surfaces 17 and 18 of each post are inclined slightly with respect to the central vertical axis of the mechanism, that is, they are inclined to a vertical plane, the friction surfaces 17 and 18 of the post A being inclined outwardly away from said central vertical axis in upward direction and the surfaces 17 and 18 of the post B being inclined inwardly toward said vertical axis. The inclination of the friction surfaces of the two posts is the same so that the friction surfaces have flat face to face contact with each other. The friction plate portion 10 of each post is reinforced on its outer side by a longitudinal central rib 19 extending from the base portion 11 to the outer end of the friction plate. As shown most clearly in Figure 2, the outer edge of the rib is rounded off transversely to correspond with the curvature of the cylindrical outer surface 14 of said base portion 11 and merges with the surface 14, as shown in Figure 1. The rib 19 is preferably slightly inclined inwardly toward the vertical axis of the mechanism, the rib of the post A being inclined inwardly in upward direction and that of the post B being inclined inwardly in downward direction. Each post is thus, in effect, tapered toward its outer end. Each follower plate member 13 is provided with a central pocket or seat 20 adapted to receive the usual spring centering projection of the corresponding spring follower plate 21 of the truck spring cluster, said follower plate being shown in dotted lines in Figure 1.

The parts of the friction posts are so proportioned that movement of the posts in lengthwise direction toward each other is positively limited by engagement of the outer end of the post B with the upper side of the base portion 11 of the post A and by engagement of the outer end of the post A with the underneath side of the base portion 11 of the post B.

The spring resistance C, which is in the form of a heavy coil, surrounds the posts A and B and bears at its top and bottom ends on the top and bottom follower plate members 13—13. The spring C is under initial compression and the inner sides of the top and bottom coils bear on the vertical walls 14 of the base portions 11 of the posts at the outer sides of said posts, that is, the inner side of the coil at the upper end of the spring bears on the wall 14 of the base member 11 of the post B at the left hand side of the mechanism, and the coil at the lower end of the spring bears on the wall 14 of the base member 11 of the post A, at the right hand side of the mechanism, as seen in Figure 1. Inasmuch as the cylindrical base portions 11 of the posts are eccentric to the vertical central axis of the spring C and the mechanism as a whole, there is a substantial clearance between the wall 14 of the base member 11 of the post A and the inner side of the lower coil of the spring at the left hand side of the mechanism and between the wall 14 of the base member 11 of the post B and the inner side of the upper coil of the spring at the right hand side, as seen in Figure 1.

In assembling the mechanism, the spring C is first placed over the friction plate 10 of the post A. The post B is then assembled with the other parts by inserting the friction plate 10 of the same downwardly within the coils of the spring, the posts A and B being held in tilted position away from each other, so that the enlargements 15—15 thereof will pass each other. This tilting movement of the posts within the spring is permitted by the clearance provided due to the taper of the ribbed portions of the posts. The parts are forced together until the shoulders 16—16 pass each other, whereupon the shoulder of the post B will snap under the shoulder of the post A, thereby locking the posts together against lengthwise separation.

Our improved shock absorber preferably replaces one or more of the spring units of a truck spring cluster, being interposed between the usual top and bottom spring plates which cooperate with said cluster, however, several of such shock absorbing units may be employed in a single spring cluster replacing two or more units of the latter.

The operation of the improved shock absorber is as follows: Upon the spring cluster of the truck of a railway car being compressed between the spring follower plates of the cluster, the shock absorbing unit, which is disposed between said follower plates, is compressed therewith, thereby forcing the post B downwardly toward the post A against the resistance of the spring C. Due to inclination of the cooperating friction surfaces thereof, the posts are forced laterally outwardly during relative lengthwise movement of the same, thereby either sliding the same laterally on their bases or causing rocking or tilting movement thereof with resulting tilting of the follower plates 13—13 on the spring follower plates 21—21 of the truck spring cluster. This sliding or tilting action being resisted by the spring C causes the friction surfaces of the posts to be pressed more tightly together. At the same time, due to the sliding or tilting of the follower plate members 13—13, a canting action of the spring is produced which causes the coil at the lower end of the spring to be forced laterally against the cylindrical base portion of the post A at the right hand side of the mechanism and the coil at the upper end of the spring to be forced laterally against the cylindrical base portion of the post B at the left hand side of the mechanism, thereby further pressing together the friction surface portions of said posts. During relative lengthwise movement of the posts on their friction surfaces, during compression of the mechanism, the required frictional resistance is developed to effectively snub the action of the truck springs. Upon release of the mechanism, the posts A and B are restored to the normal position shown in Figure 1 by the expansive action of the spring C, longitudinal separation of the posts being limited by engagement of the shoulders 16—16 of the posts with each other. As will be evident, frictional resistance is also had during this releasing action to effect snubbing of the truck springs during recoil.

We have herein shown and described what we now consider the preferred manner of carrying out our invention, but the same is merely illustrative and we contemplate all changes and modifications that come within the scope of the claims appended hereto.

We claim:

1. In a friction shock absorber mechanism, the combination with a pair of relatively lengthwise slidable friction posts at diametrically opposite sides of the mechanism having interengaging friction surfaces on their inner sides inclined to the longitudinal axis of the mechanism; of a coil spring extending lengthwise of the mechanism and surrounding said posts, said spring exerting lateral inward pressure on the posts and having shouldered engagement with the posts to oppose relative lengthwise movement thereof toward each other.

2. In a friction shock absorber mechanism, the combination with a pair of relatively lengthwise movable friction posts at diametrically opposite sides of the mechanism having longitudinally extending, interengaging friction surfaces on their inner sides inclined to the longitudinal axis of the mechanism; of end followers integral with the outer end portions of said posts, said end followers being disposed at opposite ends of the mechanism; and a coil spring surrounding said posts and bearing at opposite ends on said end followers, said spring having lateral bearing engagement with said posts at said outer end portions thereof to hold the same in engagement with each other.

3. In a friction shock absorber mechanism, the combination with upper and lower spring follower plates; of a post depending from said upper follower plate at one side of the longitudinal central axis of the mechanism, said post having a longitudinally extending friction surface on the inner side thereof inclined toward the central vertical axis of the mechanism in upward direction; a second post upstanding from said lower follower plate at the diametrically opposite side of the longitudinal central axis of the mechanism, said last named post having a friction surface on the inner side extending lengthwise thereof and engaging with and correspondingly inclined to the friction surface of said first named post; and a coil spring surrounding said posts and having engagement at its top and bottom ends with said follower plates, said spring having lateral bearing engagement with the posts at the follower plate ends thereof to hold the same in frictional engagement with each other.

4. In a friction shock absorber mechanism, the combination with a pair of relatively lengthwise slidable friction posts at diametrically opposite sides of the mechanism having interengaging friction surfaces on their inner sides inclined to the longitudinal central axis of the mechanism; of a coil spring surrounding said posts; and side abutment faces on the base portions of said posts on which the inner sides of the top and bottom end coils of the spring bear to force said posts laterally toward each other.

5. In a friction shock absorber mechanism, the combination with an upper spring follower plate; of a lower spring follower plate; an upper friction post depending from said upper plate; a lower friction post upstanding from said lower spring follower plate, said posts being at diametrically opposite sides of the mechanism and having longitudinally extending, interengaging friction surfaces on their inner sides inclined to the vertical; and a coil spring surrounding said posts bearing at its top and bottom ends on said upper and lower spring follower plates, said spring having the inner side of the coil at the upper end seated against the outer side of the upper post at the spring follower plate end of the same, and the inner side of the coil at the lower end seated against the outer side of the lower post at the spring follower plate end of the same.

6. In a friction shock absorber mechanism, the combination with an upper friction post having a follower plate portion at its upper end; of a lower friction post having a follower plate portion at its lower end, said posts being at diametrically opposite sides of the mechanism, said posts being displaceable laterally outwardly away from each other, said posts having interengaging, longitudinally extending friction surfaces on their inner sides inclined to the vertical; and a coil spring yieldingly opposing lateral displacement of said posts, said coil spring surrounding said posts and bearing at the top and bottom ends on said follower plates with the inner side of the upper coil thereof engaging the outer side of the upper post and the inner side of the lower coil thereof engaging the outer side of the lower post.

GEORGE A. JOHNSON.
STACY B. HASELTINE.